(12) United States Patent
Patton

(10) Patent No.: US 11,162,330 B1
(45) Date of Patent: *Nov. 2, 2021

(54) FLARE SYSTEM USING PRODUCED WATER AND OZONE INJECTION

(71) Applicant: Mark Patton, Conroe, TX (US)

(72) Inventor: Mark Patton, Conroe, TX (US)

(73) Assignee: HYDROZONIX, LLC, Conroe, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/653,864

(22) Filed: Oct. 15, 2019

Related U.S. Application Data

(63) Continuation-in-part of application No. 15/711,896, filed on Sep. 21, 2017, now Pat. No. 10,443,356.

(60) Provisional application No. 62/397,833, filed on Sep. 21, 2016, provisional application No. 62/784,525, filed on Dec. 23, 2018.

(51) Int. Cl.
*E21B 41/00* (2006.01)
*B01D 47/14* (2006.01)
*C02F 1/52* (2006.01)
*B01D 47/16* (2006.01)
*C02F 1/12* (2006.01)

(52) U.S. Cl.
CPC ......... *E21B 41/0071* (2013.01); *B01D 47/14* (2013.01); *B01D 47/16* (2013.01); *C02F 1/52* (2013.01); *C02F 1/12* (2013.01)

(58) Field of Classification Search
CPC ..... E21B 41/005; E21B 43/34; E21B 41/0071
See application file for complete search history.

(56) References Cited

U.S. PATENT DOCUMENTS

| 4,351,729 | A | 9/1982 | Witt |
| 5,484,279 | A | 1/1996 | Vonasek |
| 8,967,995 | B1 | 3/2015 | Griffin et al. |

(Continued)

OTHER PUBLICATIONS

International Search Report and Written Opinion, PCT/US2019/68301, Hydrozonix, LLC (international filing date Dec. 23, 2019).

*Primary Examiner* — Blake E Michener
(74) *Attorney, Agent, or Firm* — Wayne Edward Ramage; Baker Donelson

(57) ABSTRACT

A system and apparatus for treating and disposing of produced water in conjunction with flared gas, thereby avoiding problems associated with injecting produced water back into subsurface strata. The system is installed at or near the wellhead where produced water being treated is at a higher temperatures. Produced water is treated with ozone injection in a scrubber with heat applied through a flare gas field burner, which uses field gas from oilfield operations. A wet scrubber unit with scrubber packing is used to clean emissions. A produced water pump is used to circulate produced water, and pump produced water through spray nozzles in the scrubber unit for use as the wet scrubbing agent. As produced water evaporates, evaporated salts and solids are continuously removed from the evaporator/scrubber unit by appropriate means, such as an auger system. The evaporated salts and solids are then treated via chemical stabilization in a mixing system with chemical reagents to prevent the residual form from being hazardous. The residual material is then stored and disposed of properly.

12 Claims, 1 Drawing Sheet

(56) References Cited

U.S. PATENT DOCUMENTS

| | | | |
|---|---|---|---|
| 10,443,356 B1* | 10/2019 | Patton | C10L 3/106 |
| 2004/0237782 A1* | 12/2004 | Decker | B01D 53/56 |
| | | | 95/211 |
| 2016/0046505 A1 | 2/2016 | Hinners et al. | |

* cited by examiner

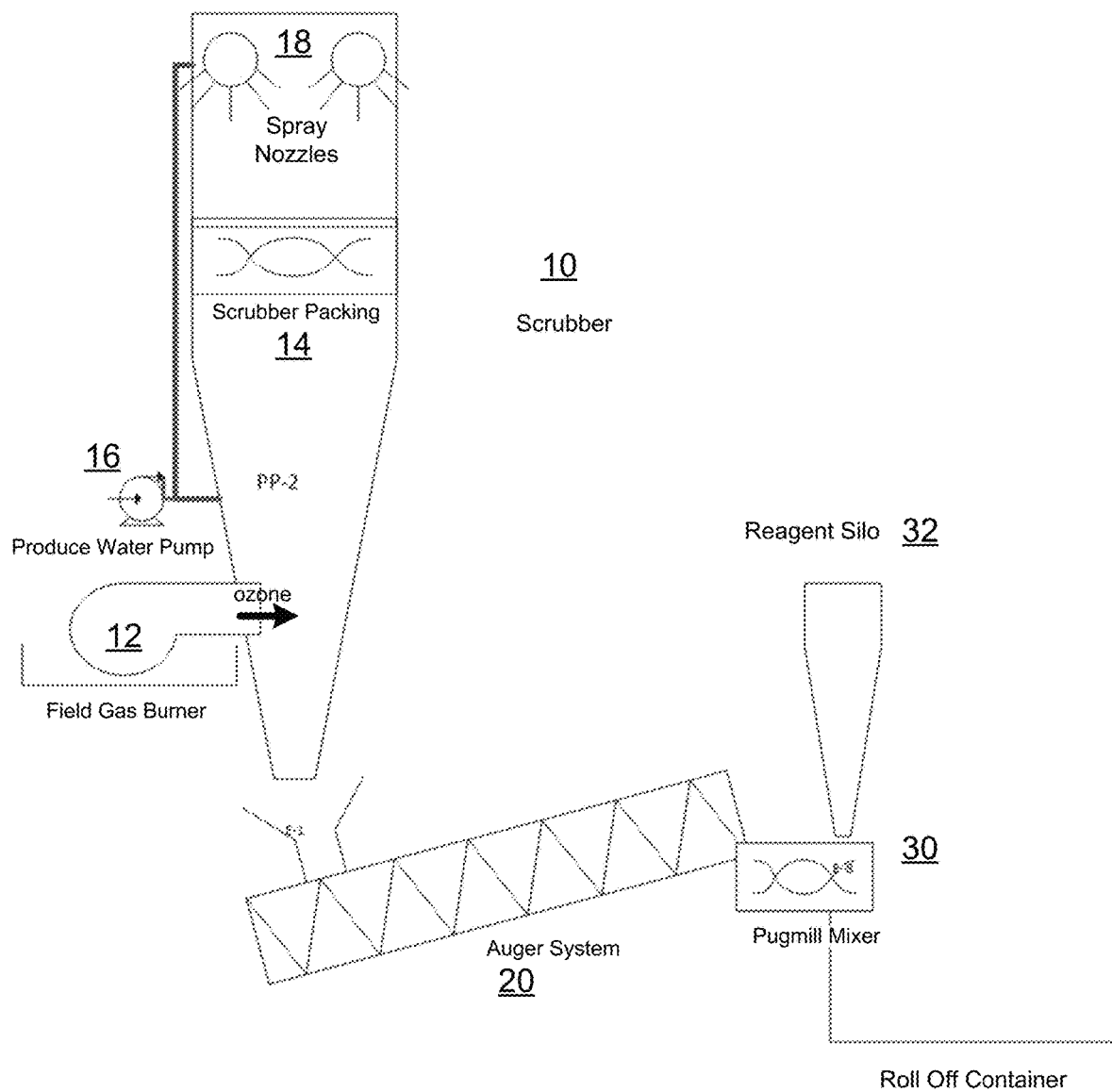

FLARE SYSTEM USING PRODUCED WATER AND OZONE INJECTION

This application is a continuation-in-part application of U.S. patent application Ser. No. 15/711,896, filed Sep. 21, 2017, which claims priority to U.S. Provisional Application No. 62/397,833, filed Sep. 21, 2016; this application also claims priority to and benefit of U.S. Provisional Application No. 62/784,525, filed Dec. 23, 2018. The specifications, drawings, and complete disclosures of U.S. Provisional Application Nos. 62/397,833 and 62/784,525, and U.S. patent application Ser. No. 15/711,896 are incorporated herein by specific reference for all purposes.

FIELD OF INVENTION

This invention relates to a system and apparatus for flaring gas from oilfield operations using produced water.

SUMMARY OF INVENTION

In various exemplary embodiments, the present invention comprises a system and apparatus for flaring gas from oilfield operations using produced water. The system provides an alternative treatment and disposal technique for produced water, thereby avoiding problems associated with injecting produced water back into subsurface strata, such as induced seismicity. The system is configured to be installed at or near the wellhead, thereby avoiding the problems of prior art centralized systems for handling produced water, which are substantially larger and built at a central location to store and gather large quantities of produced water. Centralized systems require the produced water to travel much greater distances and become cooler before treatment, thereby requiring more energy for heating or treatment. In several embodiments, the present invention uses produced water that is at a temperature of greater than 100 degrees F., thereby reducing the amount of energy required for heating.

In one exemplary embodiment, produced water is treated in a scrubber. Heat is applied through a flare gas field burner, which uses field gas from the oilfield operations (and thus provides a useful alternative to simply open flaring the field gas as a means of preventing the accumulation of field gas for safety reasons as well as preventing the venting of methane, a greenhouse gas, into the atmosphere). A wet scrubber unit with scrubber packing is used to clean emissions (e.g., nitrous oxides, sulfur oxides, acid gases, particulate matter, and the like). A produced water pump is used to circulate produced water, and pump produced water through spray nozzles in the scrubber unit for use as the wet scrubbing agent. The present invention thus optimizes contact and mixing between the hot air and water.

The above process also results in gradual evaporation of the produced water, which results in the accumulation of salts and other solids from the produced water. Evaporated salts and solids are continuously removed from the evaporator/scrubber unit by appropriate means, such as an auger system. The evaporated salts and solids are then treated via chemical stabilization in a mixing system with chemical reagents to prevent the residual form from being hazardous. The residual material is then stored and disposed of properly.

The present invention thus provides a more environmentally-friendly and efficient means of addressing several pollution and related concerns. First, the system eliminates open flaring by using the field gas in a field gas flare burner to heat produced water, and scrubbing the emissions using the heated produced water in a scrubbing unit. Second, the system eliminates or reduces the volume of produced water. And third, the system operates at or near the wellhead, thereby allowing use of the field gas while treating the produced water with less energy required.

BRIEF DESCRIPTION OF THE DRAWINGS

FIG. 1 shows a view of a system in accordance with an embodiment of the present invention.

DETAILED DESCRIPTION OF EXEMPLARY EMBODIMENTS

In various exemplary embodiments, the present invention comprises a system and apparatus for flaring gas from oilfield operations using produced water. The system provides an alternative treatment and disposal technique for produced water, thereby avoiding problems associated with injecting produced water back into subsurface strata, such as induced seismicity.

The improved system of the present invention also is configured to be installed at or near (i.e., close proximity to) the wellhead, thereby avoiding the problems of prior art centralized systems for handling produced water, which are substantially larger and built at a central location to store and gather large quantities of produced water. Centralized systems, however, require the produced water to travel much greater distances and become cooler before treatment, thereby requiring more energy for heating or treatment. The present invention uses produced water that is at a temperature of greater than 100 degrees F., thereby reducing the amount of energy required for heating.

FIG. 1 shows an exemplary embodiment of an improved system in accordance with the present invention. Produced water is treated in the scrubber 10. Heat is applied through a flare gas field burner 12, which uses field gas from the oilfield operations (and thus provides a useful alternative to simply open flaring the field gas as a means of preventing the accumulation of field gas for safety reasons as well as preventing the venting of methane, a greenhouse gas, into the atmosphere). A wet scrubber unit with scrubber packing 14 is used to clean emissions (e.g., nitrous oxides, sulfur oxides, acid gases, particulate matter, and the like). A produced water pump 16 is used to circulate produced water, and pump produced water through spray nozzles 18 in the scrubber unit for use as the wet scrubbing agent. The present invention thus optimizes contact and mixing between the hot air and water.

In an alternative embodiment, ozone is used in the wet scrubber 10 to reduce NOx by approximately 90% or more. The ozone oxidizes insoluble NOx to a water soluble species form for removal by the scubber with little or no SO2 or CO oxidation. In several exemplary embodiments, the oxidation of NOx takes place at or below 300 degrees F. (i.e., low temperature oxidation). Ozone may be generated on-site and injected to the evaporator/scrubber unit. In several embodiments, the ozone is added to the effluent gas of the thermal oxidizer prior to entering the evaporation chamber. As a result, NOx emissions are reduced.

The above process also results in gradual evaporation of the produced water, which results in the accumulation of salts and other solids from the produced water. Evaporated salts and solids are continuously removed from the evaporator/scrubber unit by appropriate means, such as an auger system 20. The evaporated salts and solids are then treated via chemical stabilization in a mixing system (e.g., treatment mixer) 30 with chemical reagents (which are stored in a reagent silo 32) to chemically stabilize the residual and prevent the residual from being hazardous. The residual material is then stored and disposed of properly.

The present invention thus provides a more environmentally-friendly and efficient means of addressing several pollution and related concerns. First, the system eliminates open flaring by using the field gas in a field gas flare burner to heat produced water, and scrubbing the emissions using the heated produced water in a scrubbing unit. Second, the system eliminates or reduces the volume of produced water. And third, the system operates at or near the wellhead, thereby allowing use of the field gas while treating the produced water with less energy required.

Thus, it should be understood that the embodiments and examples described herein have been chosen and described in order to best illustrate the principles of the invention and its practical applications to thereby enable one of ordinary skill in the art to best utilize the invention in various embodiments and with various modifications as are suited for particular uses contemplated. Even though specific embodiments of this invention have been described, they are not to be taken as exhaustive. There are several variations that will be apparent to those skilled in the art.

What is claimed is:

1. A flare system for treating produced water, comprising:
   a scrubber unit with ozone injection and scrubber packing and a plurality of spray nozzles, said scrubber unit adapted to hold produced water;
   a field gas flare burner adapted to heat the produced water in at least a portion of the scrubber unit;
   a produced water pump adapted to circulate produced water from the heated portion to the spray nozzles, whereby sprayed produced water acts as the scrubbing agent in the scrubber unit.

2. The flare system of claim 1, whereby produced water is evaporated during processing in the scrubber unit.

3. The flare system of claim 2, further comprising means for removing salts and solids remaining after evaporation of the produced water.

4. The flare system of claim 3, wherein said means for removing comprises an augur.

5. The flare system of claim 3, further comprising a treatment mixer.

6. The flare system of claim 5, wherein the treatment mixer is configured to chemically stabilize the salts and solids removed from the scrubbing unit.

7. A system for treating produced water from a well in an oilfield, comprising:
   a scrubber unit with ozone injection and scrubber packing and a plurality of spray nozzles, said scrubber unit adapted to hold produced water from a well in an oilfield, wherein the scrubber unit is at or in close proximity to the well;
   a field gas flare burner adapted to burn natural gas from the well or other wells in the oilfield; and
   a produced water pump adapted to circulate produced water within the scrubber unit and pump a portion of said produced water to the spray nozzles, whereby sprayed produced water acts as the scrubbing agent in the scrubber unit;
   wherein the produced water in the scrubber unit is heated by the field gas flare burner.

8. The system of claim 7, whereby produced water is evaporated during processing in the scrubber unit.

9. The system of claim 8, further comprising means for removing salts and solids remaining after evaporation of the produced water.

10. The system of claim 9, wherein said means for removing comprises an augur.

11. The flare system of claim 9, further comprising a treatment mixer.

12. The flare system of claim 11, wherein the treatment mixer is configured to chemically stabilize the salts and solids removed from the scrubbing unit.

* * * * *